(12) United States Patent
Manne et al.

(10) Patent No.: US 9,360,918 B2
(45) Date of Patent: Jun. 7, 2016

(54) POWER CONTROL FOR MULTI-CORE DATA PROCESSOR

(71) Applicant: Advanced Micro Devices, Inc., Sunnyvale, CA (US)

(72) Inventors: Srilatha Manne, Portland, OR (US); Sanjay Pant, Fort Collins, CO (US); Youngtaek Kim, Austin, TX (US); Michael J. Schulte, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 527 days.

(21) Appl. No.: 13/724,133

(22) Filed: Dec. 21, 2012

(65) Prior Publication Data

US 2014/0181554 A1 Jun. 26, 2014

(51) Int. Cl.
*G06F 1/32* (2006.01)

(52) U.S. Cl.
CPC ............ *G06F 1/3234* (2013.01); *G06F 1/3243* (2013.01); *Y02B 60/1239* (2013.01)

(58) Field of Classification Search
CPC .. G06F 1/3234; G06F 1/3243; Y02B 60/1239
See application file for complete search history.

(56) References Cited

U.S. PATENT DOCUMENTS

| | | | |
|---|---|---|---|
| 4,317,181 A | 2/1982 | Teza et al. | |
| 4,698,748 A | 10/1987 | Juzswik et al. | |
| 4,747,041 A | 5/1988 | Engel et al. | |
| 4,758,945 A | 7/1988 | Remedi | |
| 4,952,817 A | 8/1990 | Bolan et al. | |
| 4,980,836 A | 12/1990 | Carter et al. | |
| 5,086,501 A | 2/1992 | DeLuca et al. | |
| 5,142,684 A | 8/1992 | Perry et al. | |
| 5,167,024 A | 11/1992 | Smith et al. | |
| 5,300,831 A | 4/1994 | Pham et al. | |
| 5,307,003 A | 4/1994 | Fairbanks et al. | |

(Continued)

FOREIGN PATENT DOCUMENTS

| | | |
|---|---|---|
| EP | 0632360 A1 | 1/1995 |
| WO | 03014902 | 2/2003 |

OTHER PUBLICATIONS

T. Miller, R. Thomas, X. Pan and R. Teodorescu, "VRSync: Characterizing and Eliminating Synchronization-Induced Voltage Emergencies in Many-core Processors", Jun. 2012, p. 249 to p. 260, 39th Annual International Symposium on Computer Architecture (ISCA).

(Continued)

*Primary Examiner* — M Elamin
(74) *Attorney, Agent, or Firm* — Polansky & Associates, P.L.L.C.; Paul J. Polansky

(57) ABSTRACT

A multi-core data processor includes multiple data processor cores and a circuit. The multiple data processor cores each include a power state controller having a first input for receiving an idle signal, a second input for receiving a release signal, a third input for receiving a control signal, and an output for providing a current power state. In response to the idle signal, the power state controller causes a corresponding data processor core to enter an idle state. In response to the release signal, the power state controller changes the current power state from the idle state to an active state in dependence on the control signal. The circuit is coupled to each of the multiple data processor cores for providing the control signal in response to current power states in the multiple data processor cores.

25 Claims, 6 Drawing Sheets

(56) References Cited

U.S. PATENT DOCUMENTS

| | | | |
|---|---|---|---|
| 5,396,635 A | 3/1995 | Fung | |
| 5,423,045 A | 6/1995 | Kannan et al. | |
| 5,428,790 A | 6/1995 | Harper | |
| 5,485,127 A | 1/1996 | Bertoluzzi et al. | |
| 5,504,909 A | 4/1996 | Webster et al. | |
| 5,752,011 A | 5/1998 | Thomas et al. | |
| 5,758,175 A | 5/1998 | Fung | |
| 5,778,237 A | 7/1998 | Yamamoto et al. | |
| 5,781,783 A | 7/1998 | Gunther et al. | |
| 5,787,294 A | 7/1998 | Evoy | |
| 5,798,918 A | 8/1998 | Georgiou et al. | |
| 5,812,860 A | 9/1998 | Horden | |
| 5,832,284 A | 11/1998 | Michail et al. | |
| 5,838,578 A | 11/1998 | Pippin | |
| 5,860,125 A | 1/1999 | Reents | |
| 5,892,959 A | 4/1999 | Fung | |
| 5,898,232 A | 4/1999 | Reents | |
| 5,940,785 A | 8/1999 | Georgiou | |
| 5,991,883 A | 11/1999 | Atkinson | |
| 6,047,248 A | 4/2000 | Georgiou | |
| 6,079,025 A | 6/2000 | Fung | |
| 6,119,241 A | 9/2000 | Michail | |
| 6,141,762 A | 10/2000 | Nicol et al. | |
| 6,311,287 B1 | 10/2001 | Dischler et al. | |
| 6,691,236 B1 | 2/2004 | Atkinson | |
| 6,711,447 B1 | 3/2004 | Saeed | |
| 6,785,826 B1 | 8/2004 | Durham et al. | |
| 6,789,037 B2 | 9/2004 | Gunther | |
| 6,789,207 B1 | 9/2004 | Maejima | |
| 6,792,582 B1 | 9/2004 | Cohn et al. | |
| 6,804,632 B2 | 10/2004 | Orenstien et al. | |
| 6,845,456 B1 | 1/2005 | Menezes et al. | |
| 6,859,882 B2 | 2/2005 | Fung | |
| 6,889,332 B2 | 5/2005 | Helms et al. | |
| 6,895,520 B1 | 5/2005 | Altmedj | |
| 6,908,227 B2 | 6/2005 | Rusu | |
| 6,922,783 B2 | 7/2005 | Knee | |
| 6,931,559 B2 | 8/2005 | Burns et al. | |
| 6,976,182 B1 | 12/2005 | Filippo | |
| 6,978,389 B2 | 12/2005 | Jahnke | |
| 6,993,669 B2 | 1/2006 | Sherburne | |
| 7,028,196 B2 | 4/2006 | Soltis | |
| 7,032,119 B2 | 4/2006 | Fung | |
| 7,051,218 B1 | 5/2006 | Gulick | |
| 7,174,467 B1 | 2/2007 | Helms | |
| 7,216,064 B1 | 5/2007 | Pippin | |
| 7,228,441 B2 | 6/2007 | Fung | |
| 7,237,129 B2 | 6/2007 | Fung | |
| 7,254,721 B1 | 8/2007 | Tobias | |
| 7,272,735 B2 | 9/2007 | Fung | |
| 7,281,140 B2 | 10/2007 | Burns | |
| 7,376,848 B2 | 5/2008 | Beard | |
| 7,484,111 B2 | 1/2009 | Fung | |
| 7,496,788 B1 * | 2/2009 | Alfieri et al. | 714/21 |
| 7,512,822 B2 | 3/2009 | Fung | |
| 7,533,283 B2 | 5/2009 | Fung | |
| 7,552,350 B2 | 6/2009 | Fung | |
| 7,558,976 B2 | 7/2009 | Fung | |
| 7,562,239 B2 | 7/2009 | Fung | |
| 7,647,513 B2 | 1/2010 | Tobias | |
| 7,650,518 B2 | 1/2010 | Allarey et al. | |
| 7,664,971 B2 | 2/2010 | Oh | |
| 7,721,125 B2 | 5/2010 | Fung | |
| 7,822,967 B2 | 10/2010 | Fung | |
| 8,074,092 B2 | 12/2011 | Fung | |
| 8,086,884 B2 | 12/2011 | Naffziger | |
| 8,261,285 B2 * | 9/2012 | Felter et al. | 719/310 |
| 8,417,848 B2 * | 4/2013 | Yang et al. | 710/33 |
| 2002/0004912 A1 | 1/2002 | Fung | |
| 2003/0030326 A1 | 2/2003 | Shenai et al. | |
| 2003/0122429 A1 | 7/2003 | Zhang | |
| 2003/0135768 A1 | 7/2003 | Knee | |
| 2003/0188208 A1 | 10/2003 | Fung | |
| 2003/0196126 A1 | 10/2003 | Fung | |
| 2003/0200473 A1 | 10/2003 | Fung | |
| 2004/0117678 A1 | 6/2004 | Soltis | |
| 2004/0117680 A1 | 6/2004 | Naffziger | |
| 2005/0108582 A1 | 5/2005 | Fung | |
| 2005/0177755 A1 | 8/2005 | Fung | |
| 2005/0289365 A1 | 12/2005 | Bhandarkar | |
| 2006/0248324 A1 | 11/2006 | Fung | |
| 2006/0248325 A1 | 11/2006 | Fung | |
| 2006/0248358 A1 | 11/2006 | Fung | |
| 2006/0248359 A1 | 11/2006 | Fung | |
| 2006/0248360 A1 | 11/2006 | Fung | |
| 2006/0248361 A1 | 11/2006 | Fung | |
| 2006/0253717 A1 | 11/2006 | Fung | |
| 2006/0259796 A1 | 11/2006 | Fung | |
| 2006/0259797 A1 | 11/2006 | Fung | |
| 2006/0265608 A1 | 11/2006 | Fung | |
| 2006/0265609 A1 | 11/2006 | Fung | |
| 2007/0101173 A1 | 5/2007 | Fung | |
| 2008/0005592 A1 * | 1/2008 | Allarey et al. | 713/300 |
| 2009/0132844 A1 | 5/2009 | Allarey et al. | |
| 2011/0219382 A1 * | 9/2011 | Hou | 718/104 |
| 2013/0007413 A1 | 1/2013 | Thomson et al. | |

OTHER PUBLICATIONS

Advanced Micro Devices, Inc., "BIOS and Kernel Developer's Guide (BKDG) for AMD Family 15h Models 00h-0Fh Processors", pp. 1-2 and pp. 60-88, Nov. 14, 2011, 42301, Rev 3.04, Advanced Micro Devices, Inc., One AMD Place, Sunnyvale, CA 94085.

R. Joseph, D. Brooks, and M. Martonosi, "Control Techniques to Eliminate Voltage Emergencies in High Performance Processors," Int'l Symposium on High-Performance Computer Architecture, 2003.

E. Grochowski, D. Ayers, and V. Tiwari, "Microarchitectural Simulation and Control of di/dt-induced Power Supply Voltage Variation," Int'l Symposium on High-Performance Computer Architecture, 2002.

M. Powell and T. N. Vijaykumar, "Exploiting Resonant Behavior to Reduce Inductive Noise," Int'l Symp. on Computer Architecture, 2004.

W. EL-Essawy and D. Albonesi, "Mitigating Inductive Noise in SMT Processors," International Symposium on Low Power Electronics and Design, 2004.

M. S. Gupta, K. Rangan, M. D. Smith, G.-Y. Wei, and D. M. Brooks, "Towards a Software Approach to Mitigate Voltage Emergencies," International Symposium on Low-Power Electronics and Design, 2007.

K. Hazelwood and D. Brooks, "Eliminating Voltage Emergencies via Microarchitectural Voltage Control Feedback and Dynamic Optimization," International Symposium on Low-Power Electronics and Design, 2004.

C. Lefurgy, A. Drake, M. Floyd, M. Allen-Ware, B. Brock, J. Tierno, and John Carter, "Active Management of Timing Guardband to Save Energy in POWER7", Proceedings of the 44th Annual International Symposium on Microarchitecture, Dec. 2011.

V. J. Reddi, M. S. Gupta, G. Holloway, G. Wei, M. D. Smith, D. Brooks, "Voltage Emergency Prediction: Using Signatures to Reduce Operating Margins," HPCA, 2009.

Compaq Computer Corporation, Intel Corporation, Microsoft Corporation, Phoenix Technologies Ltd. and Toshiba Corporation, "Advanced Configuration and Power Interface Specification", 481 Pages, Revision 2.0, Jul. 27, 2000.

Anton Shilov, "AMD Unveils Bulldozer Micro-Architecture Peculiarities", 3 Pages, http://www.xbitlabs.com/news/cpu/display/20100824154814_AMD_Unveils_Details_About_Bulldozer_Microprocessors.html, Aug. 24, 2010.

Actions on Merits for Copending U.S. Appl. No. 13/724,133, filed Dec. 21, 2012.

K. Nowka et al., "A 0.9V to 1.95V Dynamic Voltage-Scalable and Frequency-Scalable 32b PowerPC Processor," 2002 IEEE International Solid-State Circuits Conference, Session 20, Microprocessors, 20.4, 0-7803-7335-9, 2 pages.

K. Nowka et al., "A 32-bit PowerPC System-on-a-Chip With Support for Dynamic Voltage Scaling and Dynamic Frequency Scaling," IEEE Journal of Solid-State Circuits, vol. 37, No. 11, Nov. 2002, pp. 1441-1447.

(56) References Cited

OTHER PUBLICATIONS

K. Suzuki et al., "A 300MIPS/W RISC Core Processor with Variable Supply-Voltage Scheme in Variable Threshold-Voltage CMOS," IEEE 1997 Custom Integrated Circuits Conference, 0-7803-3669-0, pp. 587-590.
T. Burd et al., "A Dynamic Voltage Scaled Microprocessor System," IEEE Journal of Solid-State Circuits, vol. 35, No. 11, Nov. 2000, pp. 1571-1580.
S. Sakiyama et al., "A lean power management technique: The lowest power consumption for the given operating speed of LSIs," 1997 Symposium on VLSI Circuits Digest of Technical Papers, 4-930813-76-X, pp. 99-100.
S. Gutta et al., "A Low-Power Integrated x86-64 and Graphics Processor for Mobile Computing Devices," 2011 IEEE International Solid-State Circuits Conference, Session 15, High-Performance SoCs & Components, 15.4, Feb. 22, 2011, pp. 270-272.
L. Benini et al., "A Survey of Design Techniques for System-Level Dynamic Power Management," IEEE Transactions on Very Large Scale Integration (VLSI) Systems, vol. 8, No. 3, Jun. 2000, pp. 299-316.
P. Macken et al., "A Voltage Reduction Technique for Digital Systems," 1990 IEEE International Solid-State Circuits Conference, Session 15, Innovative Circuit Design, FPM 15.2, 0193-6530/90/0000-0238, Feb. 16, 1990, pp. 238-239.
Compaq Computer Corporation, Intel Corporation, Microsoft Corporation, Phoenix Technologies Ltd. & Toshiba Corporation, "Advanced Configuration and Power Interface Specification," Revision 2.0a, Mar. 31, 2002, 500 pages.
D. Marculescu et al., "Application-Driven Processor Design Exploration for Power-Performance Trade-off Analysis," 2001 IEEE, 0-7803-7247-6/01, pp. 306-313.
M. Pedram, "CAD for Low Power: Status and Promising Directions," 1995 IEEE International Symposium on VLSI Technology, Systems, and Applications, 0-7803-2773-X, pp. 331-336.
G. Semeraro et al., "Dynamic Frequency and Voltage Control for a Multiple Clock Domain Microarchitecture," Proceedings of the 35th Annual IEEE/ACM International Symposium on Microarchitecture (MICRO-35), 1072-4451/02, 2002, 12 pages.
S. Akui et al., "Dynamic Voltage and Frequency Management for a Low-Power Embedded Microprocessor," 2004 IEEE International Solid-State Circuits Conference, Session 3, Processors, 3.5, Feb. 16, 2004, 10 pages.
G. Semeraro et al., "Energy-Efficient Processor Design Using Multiple Clock Domains with Dynamic Voltage and Frequency Scaling," Proceedings of the Eighth International Symposium on High-Performance Computer Architecture (HPCA'02), 1503-0897/02, 2002, 12 pages.
Intel Corporation, "Intel Pentium 4 Processor in the 423-pin Package at 1.30, 1.40, 1.50, 1.60, 1.70, 1.80, 1.90 and 2 GHz," Datasheet, 249198-005, Aug. 2001, 90 pages.
Intel Corporation, "Intel Pentium 4 Processor in the 478-Pin Package at 1.40 GHz, 1.50 GHz, 1.60 GHz, 1.70 GHz, 1.80 GHz, 1.90 GHz, and 2 GHz," Datasheet, 249887-003, Apr. 2002, 100 pages.
D. Lackey et al., "Managing Power and Performance for System-on-Chip Designs using Voltage Islands," IEEE, 0-7803-7607-2/02, 2002, pp. 195-202.
A. Iyer et al., "Microarchitecture—Level Power Management," IEEE Transactions on Very Large Scale Integration Systems (VLSI) Systems, vol. 10, No. 3, Jun. 2002, 1063-8210/02, pp. 230-239.
A. Iyer et al., "Power and Performance Evaluation of Globally Asynchronous Locally Synchronous Processors," Proceedings of the 29th Annual International Symposium on Computer Architecture (ISCA'02), 1063-6897/02, 2002, 11 pages.
A. Iyer et al., "Power Aware Microarchitecture Resource Scaling," IEEE, 1530-1591/01, 2001, pp. 190-196.
A. Iyer et al., "Power Efficiency of Voltage Scaling in Multiple Clock, Multiple Voltage Cores," IEEE, 0-7803,7607-2/02, 2002, pp. 379-386.
K. Niyogi et al., "Speed and Voltage Selection for GALS Systems Based on Voltage/Frequency Islands," IEEE, 0-7803-8736-8/05, 2005, pp. 292-297.
T. Pering et al., "The Simulation and Evaluation of Dynamic Voltage Scaling Algorithms," ACM, 1-58113-059-7/98/0008, 1998, pp. 76-81.
H. Sanchez et al., "Thermal Management System for High Performance PowerPC Microprocessors," IEEE, 1063-6390/97, 1997, pp. 325-330.
E. Talpes et al., "Toward a Multiple Clock/Voltage Island Design Style for Power-Aware Processors," IEEE Transactions on Very Large Scale Integration (VSLI) Systems, vol. 13, No. 5, May 2005, 1063-8210, pp. 591-603.
T. Pering et al., "Voltage Scheduling in the lpARM Microprocessor System," ACM, 1-58113-190-9/00/0007, 2000, pp. 96-101.
Actions on Merits for Copending U.S. Appl. No. 13/724,271, filed Dec. 21, 2012.

\* cited by examiner

POWER CONTROL FOR MULTI-CORE DATA PROCESSOR

Related subject matter is found in a patent application entitled "Guardband Reduction for Multi-Core Data Processor", U.S. patent application Ser. No. 13/724,271, filed Dec. 21, 2012, now U.S. Pat. No. 9,223,383, by Srilatha Manne et al. and assigned to the assignee hereof.

FIELD

This disclosure relates generally to data processors, and more specifically to power control for data processors.

BACKGROUND

Integrated circuits are specified to operate within a desired power supply voltage range. However merely ensuring proper operation within the specified range alone may not be sufficient. Abrupt changes in circuit activity may cause the internal power supply voltage to temporarily overshoot or undershoot its specified range. If the integrated circuit were designed and tested to operate only within the specified range, then the temporary overshoot and undershoot would cause some of the integrated circuits to occasionally malfunction.

For example, a multi-core data processor can undergo large variations in circuit activity. Typical multi-core data processors have between four and thirty-two data processor cores, and a multi-threaded operating system can assign data processor cores different program threads. The operating system can cause the processor running the code in each thread to operate in its active state until it encounters a barrier. The barrier occurs when multiple threads are simultaneously waiting for a condition to occur or for an operand to become available. Upon encountering the barrier for a particular thread, the operating system causes the data processor core running that thread to enter an idle state. Later, when the operand becomes available or the condition occurs, then the operating system releases the data processor cores corresponding to the threads waiting at the barrier at about the same time. This sudden release causes a spike in activity and a large undershoot on the power supply voltage.

In order to compensate for occasional undershoot or overshoot, circuit designers frequently add a guardband to extend the voltage range within which the circuit will operate properly. However adding the guardband often requires designers to adopt more conservative design practices. For example, adding a large guardband in design may cause the integrated circuit to operate more slowly than would otherwise be possible to meet the extended power supply voltage range, and testing the integrated circuit with the large guardband may cause some otherwise functional integrated circuits to fail functional tests and to be discarded.

Figure 1:
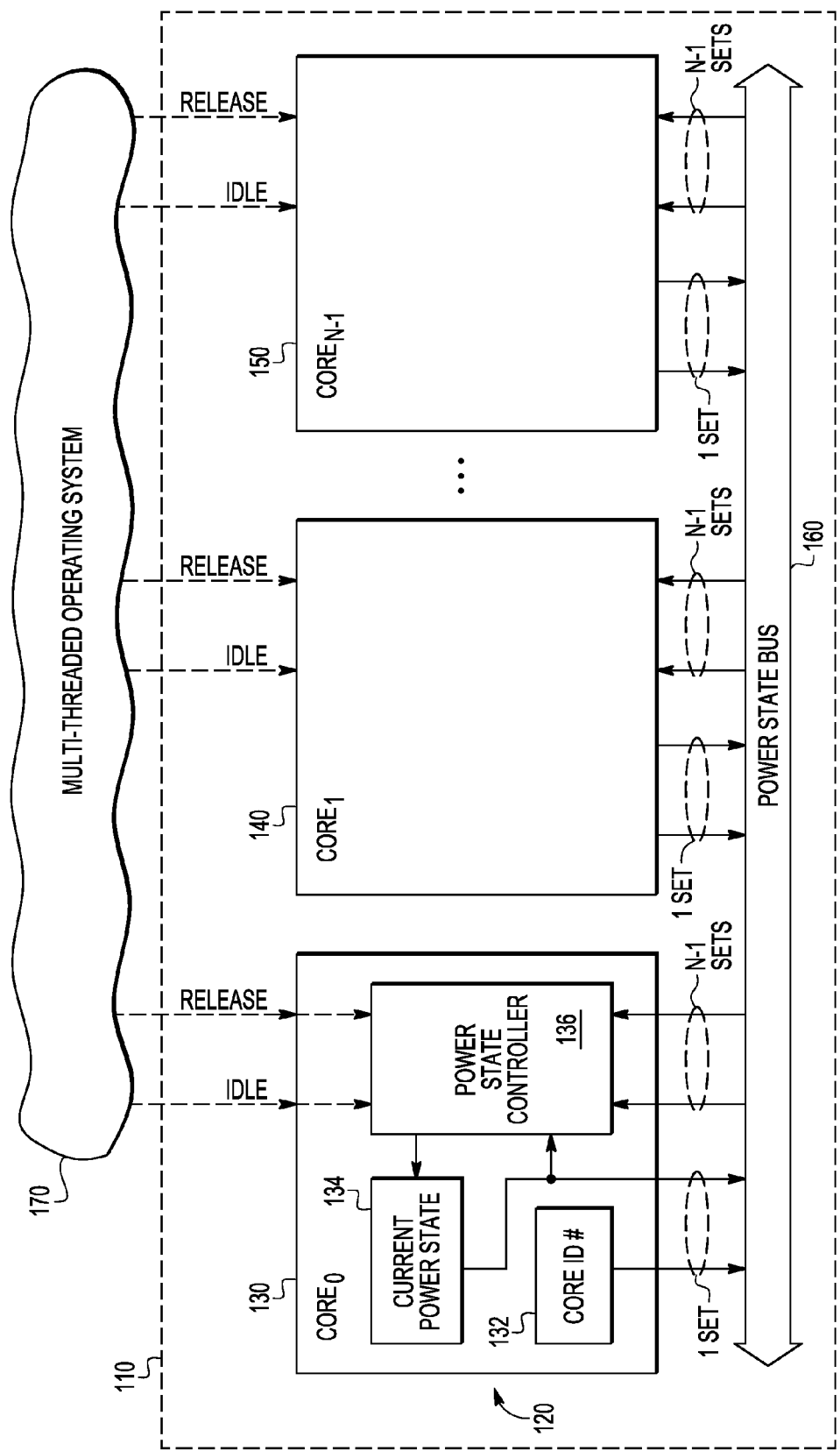
FIG. 1 illustrates in block diagram form a data processor platform according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

Generally, integrated circuits are designed to operate correctly within a specified power supply voltage range plus and minus a voltage guardband. Embodiments are described herein in which the guardband of a multi-core data processor can be reduced, or fewer failures will be encountered during operation. A multi-core data processor can undergo large variations in activity when certain events synchronize. For example, typical multi-core data processors have between four and thirty-two data processor cores. A multi-threaded operating system can assign data processor cores different program threads. The operating system can cause the processor running the code in each thread to operate in its active state until it encounters a barrier. The barrier occurs when multiple threads are simultaneously waiting for a condition to occur or for an operand to become available. Upon encountering the barrier for a particular thread, the operating system causes the data processor core running that thread to enter an idle state. Later, when the operand becomes available or the condition occurs, then the operating system releases the data processor cores corresponding to the threads waiting at the barrier at about the same time. This sudden release causes a spike in activity and a large undershoot (or "droop") on the power supply voltage, which may define the size of the guardband required.

In some embodiments, a multi-core data processor includes multiple data processor cores each having a power state controller and a circuit, such as a power state bus or central power controller, connected to the data processor cores. The circuit provides a control signal in response to power states of multiple data processor cores. In response to a release signal, for example, each power state controller changes the power state from an idle state to an active state in dependence on the control signal. Thus when several cores are released at about the same time, such as after encountering a barrier, the data processor cores can return to the active state in a staged or slower manner to reduce power supply voltage undershoot and reduce the required guardband.

In some embodiments, each data processor core autonomously transitions from the idle state to the active state in response to a release signal based on the elapsed time from when it entered the idle state. These embodiments allow multiple data processor cores to stagger their return to the active state based on the variability of when they entered the idle state in the first place and potentially based on different pre-programmed delays, without the need for an extra circuit such as a power state bus or a central power controller to coordinate the power state change.

FIG. 1 illustrates in block diagram form a data processor platform 100 according to some embodiments. Data processor platform 100 generally includes a multi-core data processor 110 and a multi-threaded operating system (OS) 170. Multi-core data processor 110 includes N data processor cores 120 including a representative data processor core 130 labeled "$CORE_0$,", a representative data processor core 140 labeled "$CORE_1$,", and a representative data processor core 150 labeled "$CORE_{N-1}$". Multi-core data processor 110 also includes a power state bus 160. Each of data processor cores 120 includes a corresponding core identification register 132 labeled "CORE ID #", a corresponding current power state register 134, and a corresponding power state controller 136.

Each core identification register 132 has an output to provide a corresponding core identification number to power state bus 160. Each current power state register 134 has an input, and an output to provide a current power state. Together the core identification number and the current power state form one set of signals to identify the power state of data processor core 130. Each power state controller 136 has an input to receive a signal labeled "IDLE", an input to receive a signal labeled "RELEASE", N−1 sets of inputs to receive core identification numbers and power states from the other data processor cores, and an output connected to the input of current power state register 134.

Power state bus 160 receives a set of power signals from each of data processor cores 120, and conducts the N sets of power state signals between data processor cores 120 such that each data processor core outputs its own set of power state signals and receives power state signals from all other data processor cores. In this way, each data processor core can make decisions about how to change its own power state based on the states of the other cores.

In operation, multi-threaded OS 170 causes various data processor cores to enter the idle state when their respective threads encounter a barrier. FIG. 1 illustrates this interaction by dashed lines conveying the IDLE and RELEASE signals between multi-threaded OS 170 and the power state controllers of corresponding data processor cores. However, multi-threaded OS 170 data processor cores 120 only communicate these signals indirectly. For example, when a data processor core encounters a barrier in the thread it is executing, the thread requests multi-threaded OS 170 to wait for the condition and passes control to multi-threaded OS 170. Multi-threaded OS 170 then waits for the event to occur by executing an idle thread, during which it direct the affected data processor core to enter the idle state to save power. When multi-threaded OS 170 later receives the operand or the condition occurs, multi-threaded OS 170 receives an interrupt to cause it to leave the idle thread, and subsequently causes an interrupt or exception to be generated to the idled data processor core or cores which causes it or them to return to the active state. In some embodiments, the idle state could be the Advanced Configuration and Power Interface (ACPI) C6 state, whereas the active state could be the ACPI C0 state, but it should be apparent that these are just examples.

While in the idle state, each power state controller 136 monitors the power states of the other data processor cores in multi-core data processor 110, and changes a current power state in response to the RELEASE signal from an idle state to an active state in dependence on the current power states in other data processor cores. In some embodiments, power state controller 136 of a particular data processor core in the idle state will allow the power state to change from idle to active without waiting on a power state transition of another data processor core if the number of idle data processor cores is less than a threshold. In some embodiments, power state controller 136 of the particular data processor core changes the current power state without waiting on a power state transition of any other data processor core if the core identification number indicates it is first in a predetermined order. For example, the predetermined order could be from lowest-numbered core to highest-numbered core. Alternatively the predetermined order could be from highest-numbered core to lowest-numbered core. In addition in some embodiments, core identification register 132 can be programmable by multi-threaded OS 170. Moreover in some embodiments, the power state controller of a selected data processor core changes the current power state without waiting on a power state transition of another data processor core if an elapsed time after the release signal exceeds an elapsed time threshold. This feature is useful to prevent deadlock conditions from arising.

Figure 2:
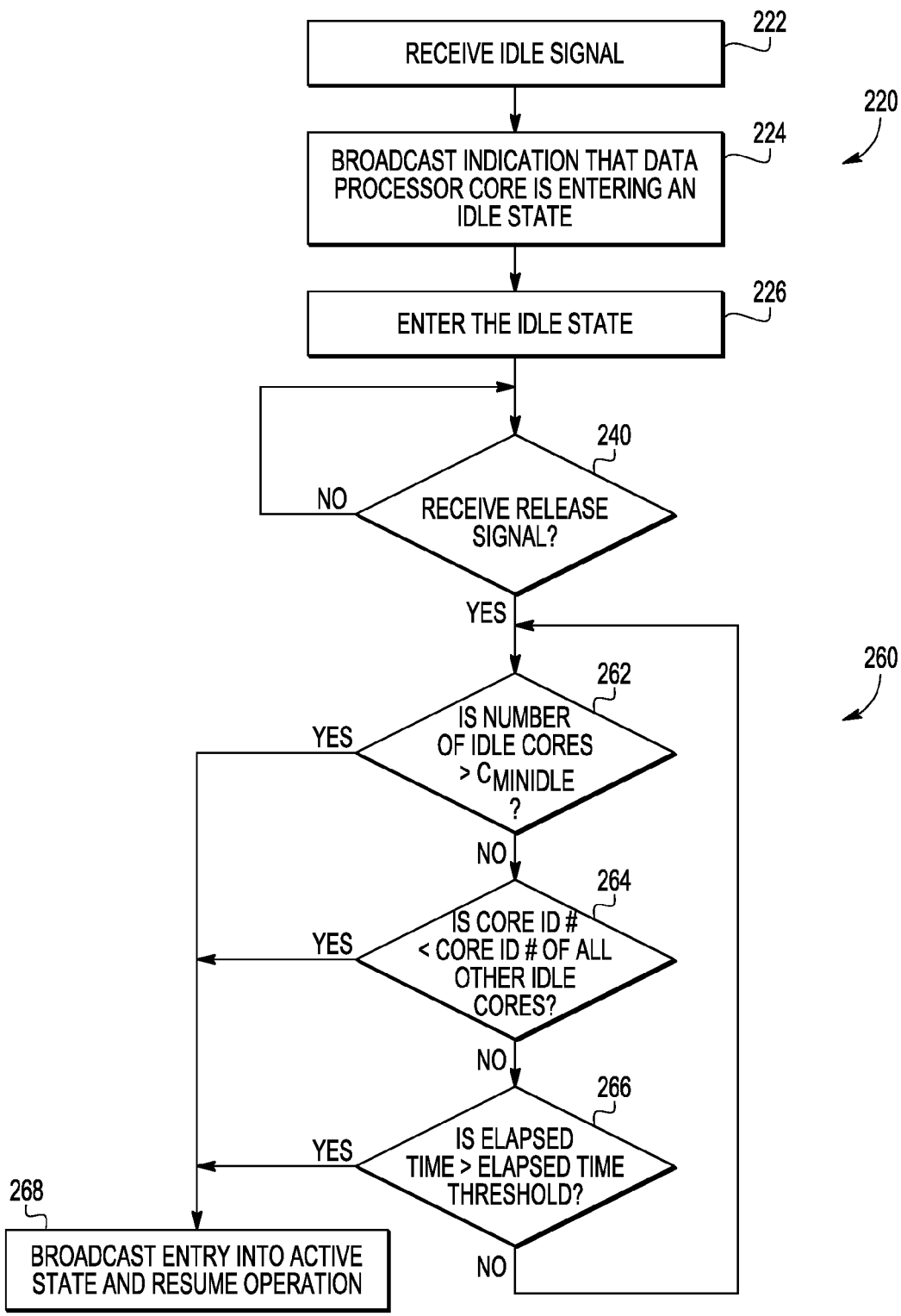
FIG. 2 illustrates a flow diagram of a method of controlling a power state transition of the data processor core of FIG. 1 according to some embodiments.

FIG. 2 illustrates a flow diagram of a method 200 of entering an active state according to some embodiments. Method 200 starts with a group of action boxes 220 for corresponding data processor cores 120 to enter the idle state, including action boxes 222, 224, and 226. Action box 222 includes receiving an IDLE signal. Action box 224 includes broadcasting an indication that corresponding data processor cores 120 are entering an idle state. Action box 226 includes entering the idle state.

The flow then proceeds to decision box 240 that includes determining whether a RELEASE signal was received. If the RELEASE signal was not received, the flow remains at decision box 240. If the RELEASE signal was received, the flow proceeds to a group of decision boxes 260 for determining when corresponding data processor cores 120 enter the active state, including decision boxes 262, 264, and 266.

Decision box 262 includes determining whether the number of idle data processor cores 120 is greater than a minimum number ($C_{MINIDLE}$). If the number of idle data processor cores 120 is greater than $C_{MINIDLE}$, the flow proceeds to action box 268 that includes broadcasting entry into the active state and resuming operation. If the number of idle data processor cores 120 is not greater than $C_{MINIDLE}$, the flow proceeds to decision box 264 that includes determining if the data processor core identification number (core ID #) is less than the core identification number of other idle data processor cores 120.

If the core ID # is less than the core ID # of other idle data processor cores 120, the flow proceeds to action box 268. If the core ID # is not less than the core ID # of other idle data processor cores 120, the flow proceeds to decision box 266 that includes determining if an elapsed time is greater than an elapsed time threshold. If the elapsed time is greater than an elapsed time threshold, the flow proceeds to action box 268. If the elapsed time is not greater than an elapsed time threshold, the flow returns to decision box 262.

Figure 3:
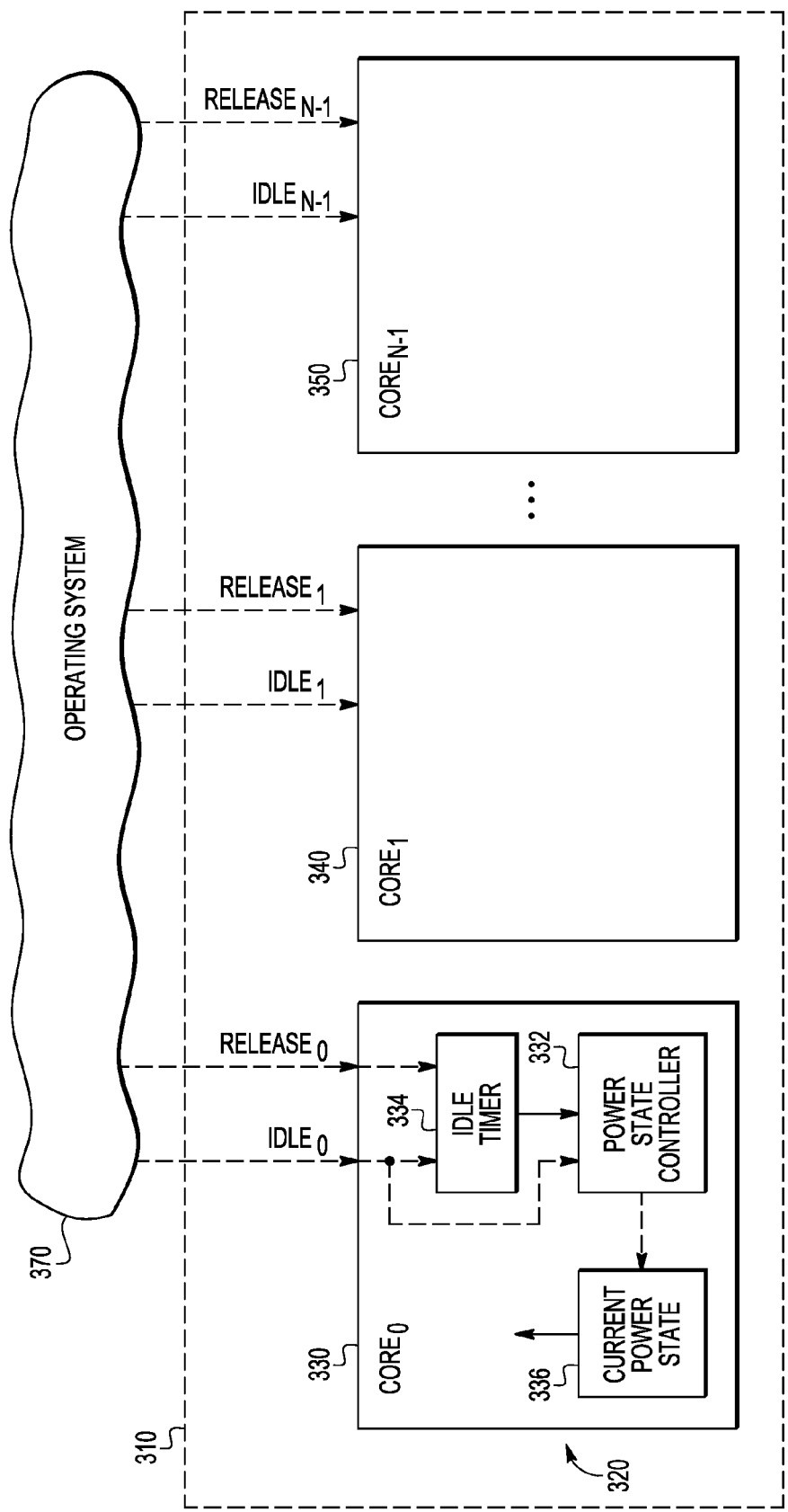
FIG. 3 illustrates in block diagram form another data processor platform according to some embodiments.

FIG. 3 illustrates in block diagram form another data processor platform 300 according to some embodiments. Data processor platform 300 generally includes a multi-core data processor 310 and a multi-threaded OS 370. Multi-core data processor 310 includes N data processor cores 320 including a representative data processor core 330 labeled "$CORE_0$,", a representative data processor core 340 labeled "$CORE_1$,", and a representative data processor core 350 labeled "$CORE_{N-1}$". Each of data processor cores 320 includes a corresponding power state controller 332, a corresponding idle timer 334, and a corresponding current power state register 336.

Each power state controller 332 has an input to receive a corresponding one of signals labeled "$IDLE_0$", "$IDLE_1$", and "$IDLE_{N-1}$", respectively, a second input, and an output. Each idle timer 334 has an input to receive one of signals $IDLE_0$, $IDLE_1$, and $IDLE_{N-1}$, respectively, an input to receive one of signals labeled "$RELEASE_0$", "$RELEASE_1$", and "$RELEASE_{N-1}$", respectively, and an output connected to the second input of power state controller 332. Each current power state register 336 has an input connected to the output of power state controller 332, and an output. Multi-threaded OS 370 provides signals $IDLE_0$, $IDLE_1$, $IDLE_{N-1}$, $RELEASE_0$, $RELEASE_1$, and $RELEASE_{N-1}$, to corresponding ones of data processor cores 320.

In operation, idle timer 334 for each data processor core provides a value on its output indicating an elapsed time between an activation of the corresponding IDLE signal and an activation of the corresponding RELEASE signal. Power state controller 332 transitions its corresponding data processor core from the active state to the idle state in response to the corresponding IDLE signal. It also transitions its corresponding data processor core from the idle state to the active state after a time determined by the elapsed time. The corresponding data processor core operates in the active state thereafter in response to the corresponding RELEASE signal. In this way, multi-core data processor 310 allows each data processor core to exit the idle state without the necessity of determining states of other data processor cores in multi-core data processor 310, and thus does not require a circuit such as power state bus 160 to communicate power state information of the other data processor cores. It also relies on the variability of times when the threads encounter the barrier to stagger the exit from idle when the barrier is released. In some embodiments, the amount of time could be made programmable to ensure a staggered exit in case the data processor cores also entered the idle state at about the same time.

In some embodiments, a data processor core exits the idle state and enters the active state if the output of its corresponding idle timer 334 exceeds an idle time threshold, but enters the active state in a dampened manner. The dampened manner could be, for example, using a reduced rate clock signal, limiting the highest P-state to a state lower than P0 and gradually raising it to P0, etc. In some embodiments, power state controller 332 exits the idle state and enters the active state in a dampened manner based on the output of idle timer 334. For example, the longer the data processor core was in the idle state, the slower the clock speed or the longer the ramp in clock speed to the highest available speed.

Figure 4:
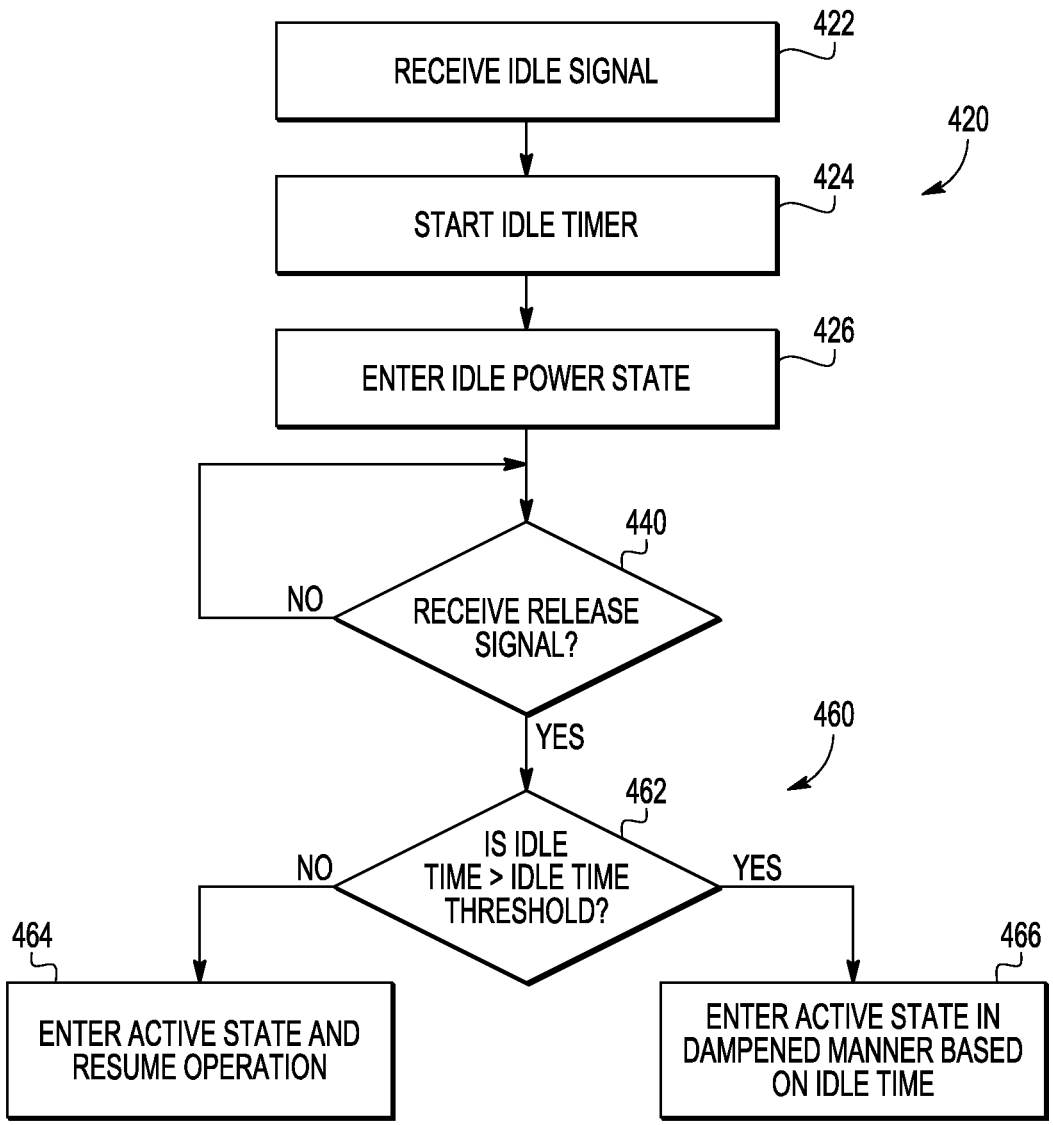
FIG. 4 illustrates a flow diagram of a method of controlling a power state transition of the data processor core of FIG. 3 according to some embodiments.

FIG. 4 illustrates a flow diagram of another method 400 of entering an active state according to some embodiments. Method 400 starts with a group of action boxes 420 for corresponding data processor cores 320 to enter the idle state, including action boxes 422, 424, and 426. Action box 422 includes detecting an IDLE condition. Action box 424 includes starting an idle timer. Action box 426 includes entering the idle state.

The flow then proceeds to decision box 440 that includes receiving a release indication. If a release indication is not received, the flow remains at decision box 440. If a release indication is received, the flow proceeds to decision box 462 that includes determining if the idle time is greater than an idle time threshold. If the idle time is not greater than an idle time threshold, the flow proceeds to action box 464 that includes entering the active state and resuming operation. If the idle time is greater than an idle time threshold, the flow proceeds to action box 466 that includes entering the active state in a dampened manner based on the idle time.

Figure 5:
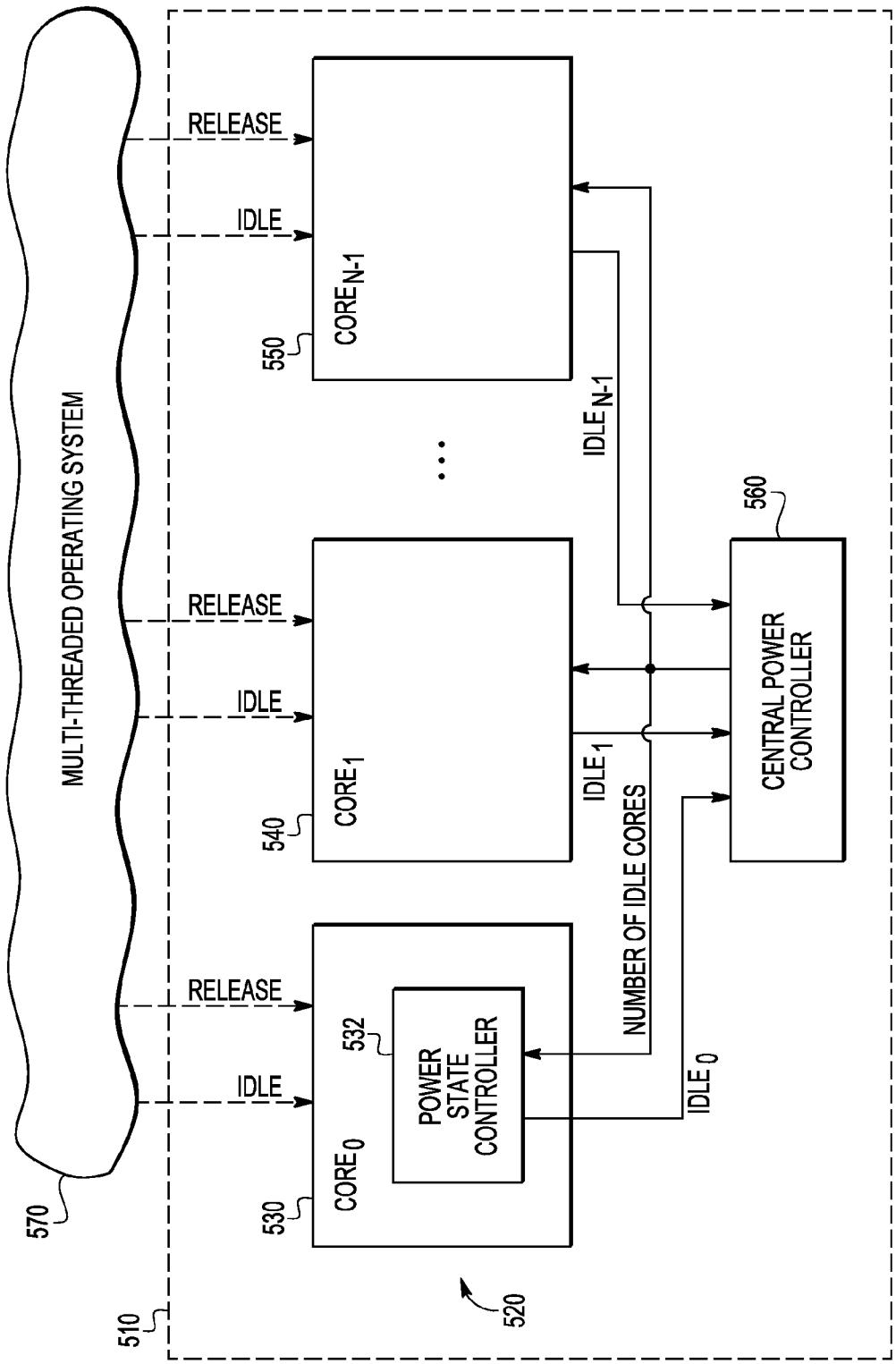
FIG. 5 illustrates in block diagram form yet another data processor platform according to some embodiments.

FIG. 5 illustrates in block diagram form yet another data processor platform 500 according to some embodiments. Data processor platform 500 generally includes a multi-core data processor 510 and a multi-threaded OS 570. Multi-core data processor 510 includes N data processor cores 520 including a representative data processor core 530 labeled "$CORE_0$", a representative data processor core 540 labeled "$CORE_1$", and a representative data processor core 550 labeled "$CORE_{N-1}$". Multi-core data processor 510 also includes a central power controller 560. Each of data processor cores 520 includes a corresponding power state controller 532.

Each of data processor cores 520 has an input to receive the IDLE signal, and an input to receive the RELEASE signal. Each power state controller 532 has an input to receive a signal labeled "NUMBER OF IDLE CORES", and an output to provide a corresponding one of signals labeled "$IDLE_0$", "$IDLE_1$", and "$IDLE_{N-1}$", respectively.

Central power controller 560 has a set of inputs to receive signals $IDLE_0$, $IDLE_1$, and $IDLE_{N-1}$, from each power state controller 532, respectively, and an output to provide the NUMBER OF IDLE CORES signal to each power state controller 532. Multi-threaded OS 570 provides corresponding IDLE and RELEASE signals to each of data processor cores 520.

In operation, multi-core data processor 510 includes central power controller 560 to centrally control the power state transitions for data processor cores 520. Central power controller 560 provides the NUMBER OF IDLE CORES signal to each data processor core to indicate the number of data processor cores currently in the idle state. In response, when receiving a corresponding RELEASE signal, power state controller 532 of an idle data processor core changes the current power state from the idle state to the active state in dependence on the NUMBER OF IDLE CORES signal. In some embodiments, power state controller 532 changes from the idle state to the active state after a duration determined by the NUMBER OF IDLE CORES signal. The duration could be made programmable in order to stagger the wakeup of idle data processor cores after the release of a barrier. In some embodiments, the idle data processor core further wakes up more slowly if the NUMBER OF IDLE CORES exceeds a threshold.

In some embodiments, power state controller 532 exits the idle state and enters the active state for a particular data processor core more slowly if the total number of idle data processor cores 520 exceeds a threshold.

In some embodiments, power state controller 532 exits the idle state and enters the active state in a staged wakeup where corresponding data processor cores 520 wake up in a first time period if control signal NUMBER OF IDLE CORES is not greater than a threshold and corresponding data processor cores 520 wake up in a second time period longer than the first time period if control signal NUMBER OF IDLE CORES is greater than the threshold.

In some embodiments, power state controller 532 exits the idle state and enters the active state in a staged wakeup where corresponding data processor cores 520 wake up in N clock cycles if control signal NUMBER OF IDLE CORES is not greater than a threshold and corresponding data processor cores 520 wake up in (N+M) clock cycles if control signal NUMBER OF IDLE CORES is greater than the threshold.

By counting the number of idle cores and broadcasting this number to all data processor cores using central power controller 560, multi-core data processor 510 is able to prevent all threads from releasing at the same time and does so with a small common circuit and a small amount of signal routing.

Figure 6:
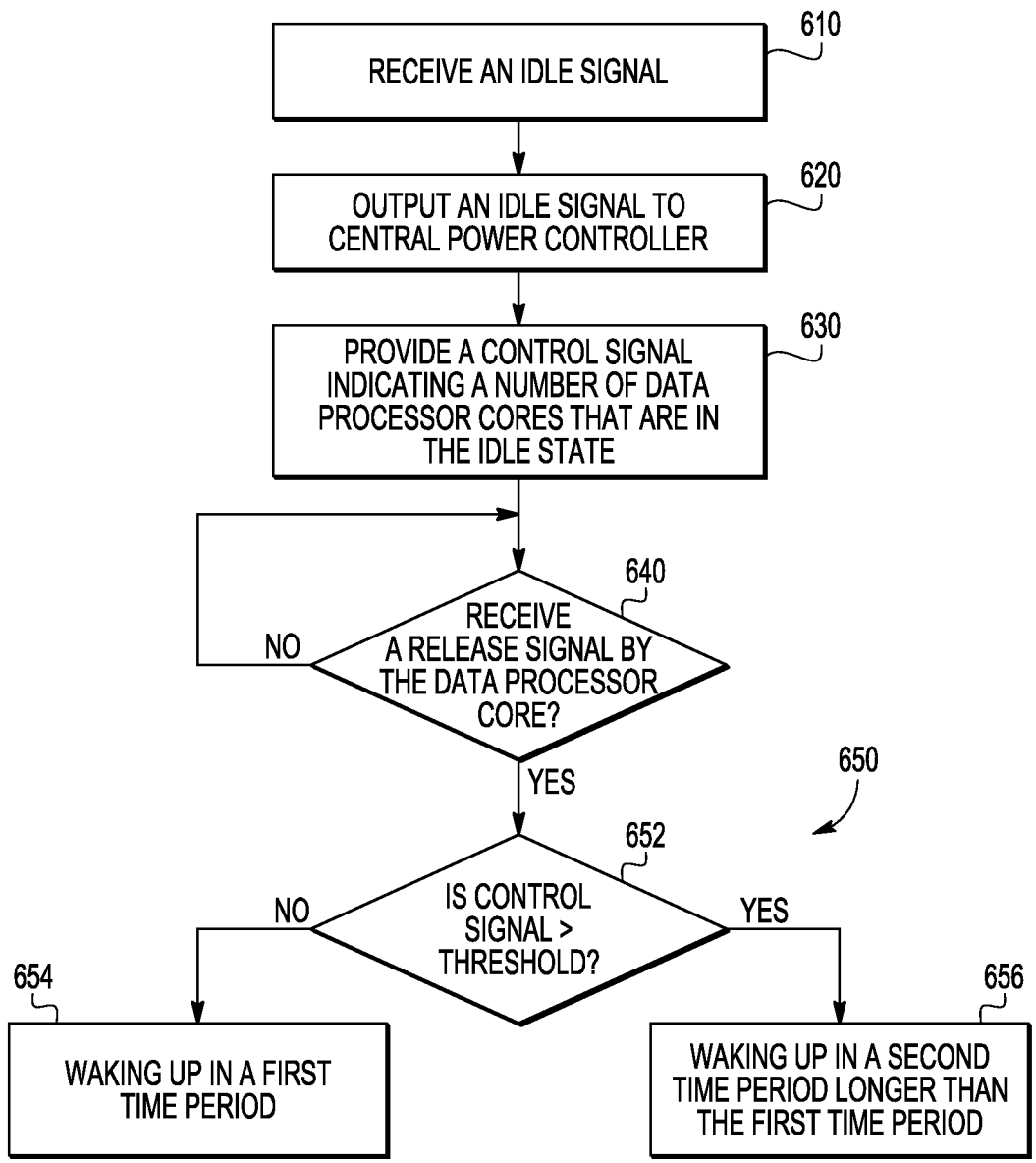
FIG. 6 illustrates a flow diagram of a method of controlling a power state transition of the data processor core of FIG. 5 according to some embodiments.

FIG. 6 illustrates a flow diagram of a method 600 of controlling a power state transition of a data processor core of FIG. 5 according to some embodiments. Method 600 starts with action box 610 that includes receiving an IDLE signal. Action box 620 includes outputting an idle signal from the data processor core to central power controller 560. Action box 630 includes providing a control signal indicating a number of data processor cores that are in the idle state, illustrated in FIG. 5 as the NUMBER OF IDLE CORES signal.

The flow then proceeds to decision box 640 that includes determining whether a RELEASE signal was received. If the RELEASE signal was not received, the flow remains at decision box 640. If the RELEASE signal was received, the flow proceeds to a group of boxes 650 for waking up the data processor core, including boxes 652, 654, and 656.

Decision box 652 includes determining whether a control signal (e.g. NUMBER OF IDLE CORES) is greater than a threshold. If the control signal is not greater than a threshold, the flow proceeds to action box 654 that includes waking up in a first time period. If the control signal is greater than a threshold, the flow proceeds to action box 656 that includes waking up in a second time period that is longer than the first time period.

The functions of FIGS. 1-6 may be implemented with various combinations of hardware and software, and the software component may be stored in a computer readable storage medium for execution by at least one processor. Moreover the method illustrated in FIGS. 2, 4, and 6 may also be governed by instructions that are stored in a computer readable storage medium and that are executed by at least one processor. Each of the operations shown in FIGS. 2, 4, and 6 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, the functions of FIGS. 1-6 may be described or represented by a computer accessible data structure in the form of a database or other data structure which can be read by a program and used, directly or indirectly, to fabricate integrated circuits of FIGS. 1-6. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising integrated circuits of FIGS. 1-6. The netlist may then be placed and routed to produce a data set describing geometric shapes to be applied to masks. The masks may then be used in various semiconductor fabrication steps to produce integrated circuits of FIGS. 1-6. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, in the illustrated embodiments, multi-core data processors 110, 310, and 510 include N data processor cores 120, and N could be various numbers such as 4, 8, or 32. Data processor cores 120, 320, and 520 could be various logic circuits with active and idle states, such as central processing unit (CPU) cores, a graphics processor unit (GPU) cores, advanced processing unit (APU) cores, digital signal processor (DSP) cores, and the like. Data processor cores 120, 320, and 520, respectively, could use a common circuit design or different circuit designs.

Accordingly, it is intended by the appended claims to cover all modifications of the disclosed embodiments that fall within the scope of the disclosed embodiments.

What is claimed is:

1. A multi-core data processor comprising:
a plurality of data processor cores, each data processor core comprising a power state controller having a first input for receiving an idle signal from each of the plurality of data processor cores, a second input for receiving a release signal, a third input for receiving a control signal, and an output for providing a current power state, wherein in response to said idle signal, said power state controller causes a corresponding data processor core to enter an idle state, and in response to said release signal, said power state controller changes said current power state from said idle state to an active state in dependence on said control signal;
a central power state controller coupled to each of said plurality of data processor cores for providing said control signal in response to current power states in said plurality of data processor cores,
said central power state controller further including inputs coupled to said outputs of each of said plurality of data processor cores, and having an output coupled to each of said plurality of data processor cores for providing said control signal equal to a total number of idle cores; and
wherein each of said plurality of data processor cores wakes up from said idle state in dependence on said control signal.

2. The multi-core data processor of claim 1, wherein each of said plurality of data processor cores wakes up after a duration determined by said control signal.

3. The multi-core data processor of claim 2, wherein each of said plurality of data processor cores wakes up more slowly if said total number of idle cores exceeds a threshold.

4. A multi-core data processor comprising:
a plurality of data processor cores, each data processor core comprising
a power state controller having a first input for receiving an idle signal, a second input for receiving a release signal, a third input for receiving a control signal, and an output for providing a current power state, wherein in response to said idle signal, said power state controller causes a corresponding data processor core to enter an idle state, and in response to said release signal, said power state controller changes said current power state from said idle state to an active state in dependence on said control signal; and
a circuit coupled to each of said plurality of data processor cores for providing said control signal in response to current power states in said plurality of data processor cores, wherein said circuit comprises:
a power state bus coupled to each of said plurality of data processor cores, wherein said control signal for each data processor core indicates said current power state and a core identification number corresponding to said current power state of others of said plurality of data processor cores.

5. The multi-core data processor of claim 4 wherein each of said plurality of data processor cores further comprises:
a core identification register for storing said core identification number and having an output coupled to said power state bus; and
a current power state register for storing said current power state and having an output coupled to said power state bus.

6. The multi-core data processor of claim 5, wherein said power state controller changes said current power state without waiting on a power state transition of another data processor core if a number of idle cores is less than an idle core threshold.

7. The multi-core data processor of claim 6, wherein said power state controller further changes said current power state without waiting on said power state transition of said other data processor core if said core identification number indicates said corresponding data processor core is first in a predetermined order.

8. The multi-core data processor of claim 7, wherein said predetermined order is from a lowest core identification number to a highest core identification number.

9. The multi-core data processor of claim 5, wherein said power state controller changes said current power state without waiting on a power state transition of another data processor core if an elapsed time after said release signal exceeds an elapsed time threshold.

10. The multi-core data processor of claim 9, wherein said elapsed time threshold has a value dependent on said core identification number.

11. A multi-core data processor comprising:
- a central power state controller having a first input for receiving at least one idle signal, a second input, and an output for providing a current power state and based upon a total number of received idle signals from a plurality of data processor cores, generates at least one release signal; and
- a plurality of data processor cores, each data processor core comprising:
  - a local power state controller having a first input for receiving an idle signal, a second input, and an output for providing a current power state; and
  - an idle timer having a first input for receiving said idle signal, a second input for receiving a release signal, and an output coupled to said second input of said local power state controller, wherein said idle timer provides a value on said output indicating an elapsed time between an activation of said idle signal and an activation of said release signal; and
  - wherein said local power state controller transitions a corresponding data processor core from an active state to an idle state in response to said idle signal, and transitions said corresponding data processor core from said idle state to said active state after a time determined by said elapsed time; and further wherein said corresponding data processor core operates in said active state thereafter in response to said release signal.

12. The multi-core data processor of claim 11, further comprising:
- a current power state register for storing said current power state and having an output for providing said current power state to other parts of said corresponding data processor core.

13. A method for a controller to control power, comprising:
receiving at least one idle signal from at least one data processor core of a plurality of data processor cores and placing said at least one data processor core of said plurality of data processor cores in an idle state, wherein said placing comprises:
- receiving an idle signal by said at least one data processor core;
- broadcasting an indication that said at least one data processor core is entering said idle state; and
- prompting at least one of said at least one data processing cores to enter said idle state;
receiving a release signal; and
determining whether to place said at least one data processing core to exit said idle state based on a condition of at least one other data processor core.

14. The method for a controller of claim 13 wherein said determining comprises:
- determining whether a number of idle data processor cores is less than an idle core threshold; and
- if said number of idle cores is less than said idle core threshold, broadcasting an entry into an active state for at least one data core processor and prompting at least one of said at least one data core processors to resume operation.

15. The method for a controller of claim 14 wherein said determining comprises:
- determining whether a core identification number of said data processor core is before a first idle core number in a predetermined sequence; and
- if said number of idle cores is less than said idle core threshold, broadcasting said entry into said active state and resuming operation.

16. The method for a controller of claim 15 further comprising:
- repeating said determining while said core identification number of said data processor core is not before said first idle core number in said predetermined sequence until an elapsed time exceeds an elapsed time threshold; and
- if said elapsed time exceeds said elapsed time threshold, broadcasting said entry into said active state and resuming operation.

17. The method for a controller of claim 13 further comprising:
- receiving at least one idle signal in response to said placing said at least one data processor core in said idle state; and
- staging a wakeup of said at least one of data processor core.

18. The method for a controller of claim 17 wherein said staging comprises:
- waking up said at least one data processor core in a first time period if a control signal is not greater than a threshold; and
- waking up said at least one data processor core in a second time period longer than said first time period if said control signal is greater than said threshold.

19. The method for a controller of claim 18 wherein said waking up said data processor core in said first time period comprises:
- waking up said at least one data processor core in N clock cycles.

20. The method for a controller of claim 19 wherein said waking up said at least one data processor core in said second time period comprises:
- waking up said at least one data processor core in (N+M) clock cycles.

21. A method for a controller comprising:
- receiving at least one idle signal from a data processor core of a plurality of data processor cores;
- placing said at least one data processor core in an idle state;
- receiving a release indication; and
- prompting said data processor core to exit said idle state selectively based on a length of time said data processor core was in said idle state.

22. The method for a controller of claim 21 wherein said placing comprises:
- detecting an idle condition in said data processor core;

starting an idle timer; and entering said idle state.

23. The method for a controller of claim 22 wherein said exiting comprises:

determining whether an output of said idle timer exceeds an idle time threshold; and if said output of said idle timer does not exceed said idle time threshold, entering an active state and resuming operation.

24. The method for a controller of claim 23 wherein said exiting further comprises:

if said output of said idle timer exceeds said idle time threshold, said data processor core entering said active state in a dampened manner.

25. The method for a controller of claim 24 wherein said entering said active state in said dampened manner comprises entering said active state based on said output of said idle timer.

\* \* \* \* \*